United States Patent [19]

Johnson et al.

[11] 4,142,688

[45] Mar. 6, 1979

[54] APPARATUS FOR HANDLING WASTE INCLUDING RUBBER TIRES

[76] Inventors: Albert O. Johnson, Rte. 8, Box 1052, Livingston, Tex. 77351; William E. Holiman, P.O. Box 66284, Houston, Tex. 77006; Stephen D. Buchanan, 1419 Ebony, Houston, Tex. 77018

[21] Appl. No.: 827,244

[22] Filed: Aug. 24, 1977

Related U.S. Application Data

[62] Division of Ser. No. 770,002, Feb. 18, 1977, Pat. No. 4,081,143.

[51] Int. Cl.² .............................................. B02C 13/06
[52] U.S. Cl. ...................................... 241/236; 241/239; 241/243
[58] Field of Search ............... 241/191, 195, 235, 236, 241/237, 238, 239, 240, 241, 242, 243

[56] References Cited

U.S. PATENT DOCUMENTS

| | | |
|---|---|---|
| 2,892,478 | 6/1959 | Gronberg .............................. 241/239 |
| 3,817,463 | 6/1974 | Krigbaum ...................... 241/DIG. 31 |
| 3,931,935 | 1/1976 | Holman .................................. 241/236 |
| 4,052,013 | 10/1977 | Ehrlich et al. ....................... 241/236 |
| 4,059,235 | 11/1977 | Bryant ................................... 241/236 |

*Primary Examiner*—Neil Abrams
*Attorney, Agent, or Firm*—Laurence R. Brown

[57] ABSTRACT

Waste such as combustible trash and prime garbage is mixed with rubber tires and shredded together to produce a compacted and combustible output product which can be used as a fuel or incinerated for further compacting.

The apparatus involves interengaging rotary feeder-cutter wheels mounted on counterrotating shafts to pull materials through a feed path while shredding with the aid of shredder blades interspersed between the wheels. Feeding, mixing and conveying techniques through one or more shredder stages provide for attainment of high speed feed rates and handling of some degree solid debris such as steel belts in tires.

5 Claims, 9 Drawing Figures

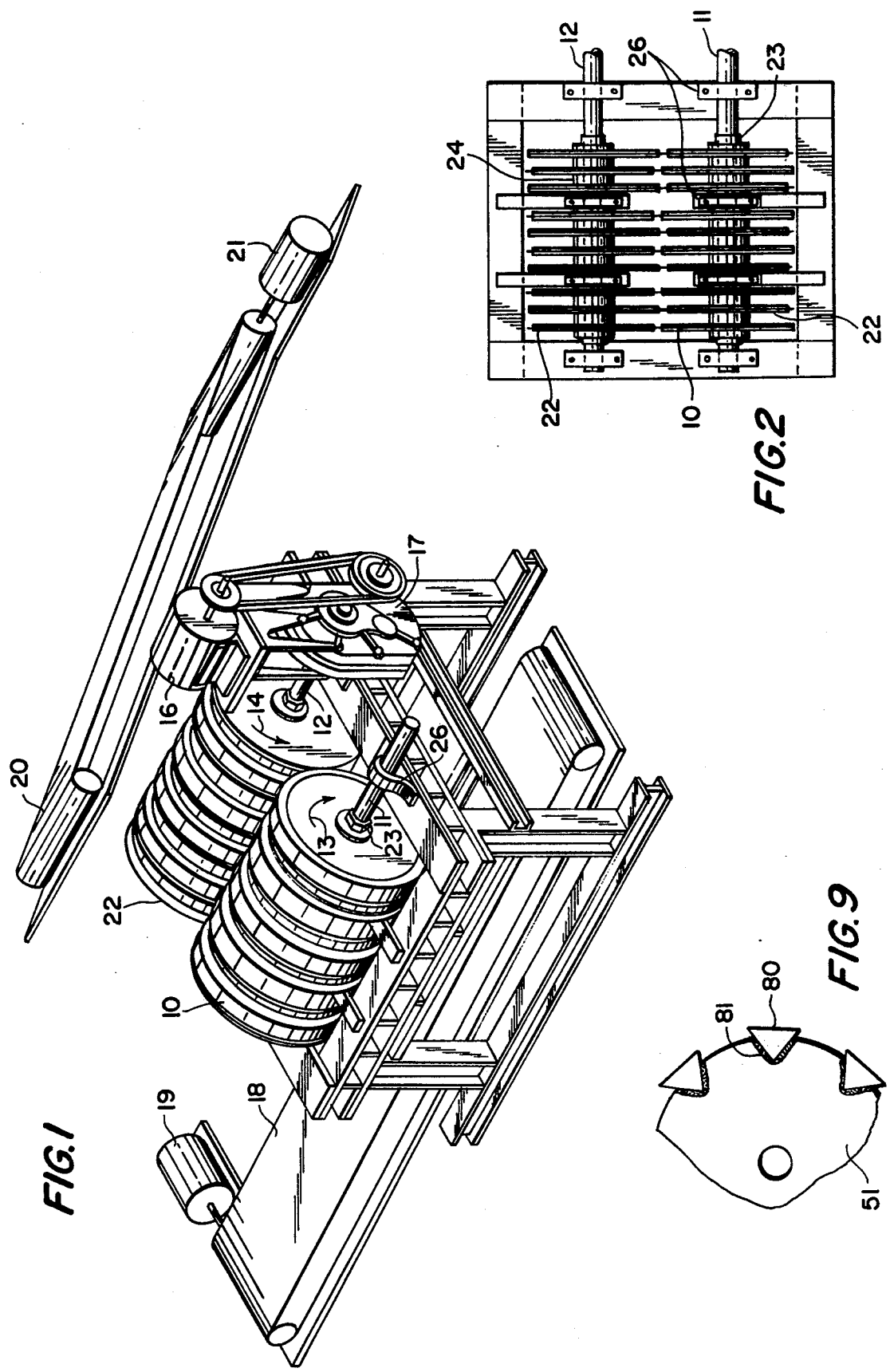

APPARATUS FOR HANDLING WASTE INCLUDING RUBBER TIRES

This is a division of application Ser. No. 770,002 filed Feb. 18, 1977, and issued on Mar. 28, 1978 as U.S. Pat. No. 4,081,143.

This invention relates to waste compacting and more specifically it relates to shredding of materials including rubber tires with steel belts.

BACKGROUND

Disposal of waste in urban areas has increasingly become a problem. Because of modern packages, mixture of trash and garbage from various foods and accumulation of such noncompactable trash as rubber tires special problems are introduced in disposal. Squeezing compactors in collection trucks are not adopted to handle tires and other substantially noncompressible materials, and although they improve packing efficiency of raw trash, they still inefficiently transport bulk trash over long distances to incinerator sites or dumps.

Conservation of energy is a concurrent problem in urban areas. Little of the combustible waste is used for useful fuel. The raw form in which combustibles are found is not generally adaptable to ready use as a fuel source. Papers, cardboard and plastic materials need be conformed in shape and density for efficient fuel use and mixtures therewith of damp waste such as garbage generally reduces the possibility of getting heat energy from the run-of-the-mill waste. Many incinerating plants require input of fuel for handling such waste. Also, the damp waste and garbage mixed with trash tends both to accumulate in conveyors and to spoil thereby causing problems both of sanitation and fouling of equipment.

OBJECTS OF THE INVENTION

It is therefore a general object of the invention to provide improved apparatus for handling waste including rubber tires.

A more specific object of the invention is to compact a wide variety of intermixed waste materials by shredding and transporting it or incinerating it in shredded form.

A still more specific object of the invention is to produce combustible waste materials useful for fuel by shredding together rubber tires with garbage, combustible trash and the like.

Other objects of the invention include the efficient mechanical processing of materials through a rotary shredder, producing output materials of uniform character from input materials of varying texture, improving the efficiency of collection and handling and conveying waste, improving material processing speed through shredding stages, producing adaptable processes for various kinds of material handling techniques, disposing of tires efficiently even when incorporating steel belts, improving shredder mechanisms and production of usable fuel from waste.

BRIEF DESCRIPTION OF THE INVENTION

This invention provides apparatus for compacting disposable waste materials including rubber tires and garbage by shredding and intermixing to produce a combustible mixture which can be efficiently transported, incinerated or used as a fuel.

The shredding involves pulling materials of varying texture through interengaging feed wheels spaced on counter-rotating parallel shafts to encounter sets of shredder blades disposed at a predetermined variable angle depending upon the texture of the waste. A series of shredder stages with different structure progressively shred the materials. Optimum mixture of diverse materials is attained to achieve a suitable output fuel product. For example, tires on one automated variable speed conveyor are mixed with trash and garbage on another variable speed conveyor to produce an optimum mix of tire and waste shreds for incineration or fuel purposes.

THE DRAWING

Other features, objects and advantages of the invention will be found hereinafter with reference to the accompanying drawing, wherein:

FIG. 1 is a perspective view of a one stage shredder assembly shown without conveyor housing details in order to set forth the feed flow path of materials therethrough;

FIG. 2 is a plan view of the relationship of the shredder feed wheels as mounted on two counterrotating parallel shafts;

FIG. 9 shows in a fragmentary side view details of conveying structure teeth attached to the feed wheels.

THE DETAILED DESCRIPTION

Figure 4:
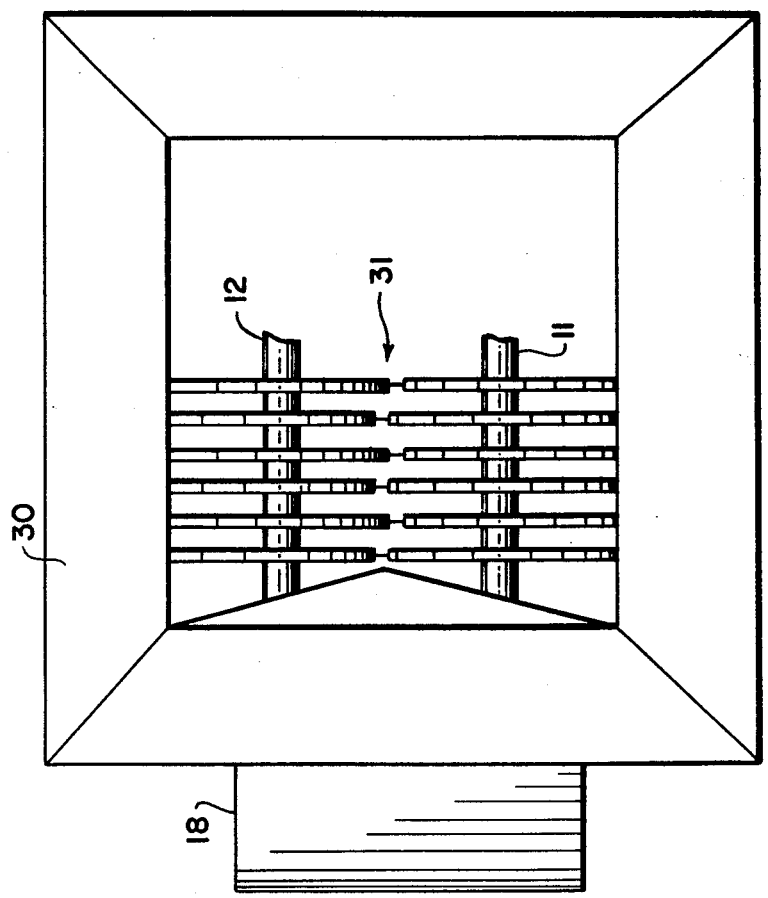
FIGS. 3 and 4 are respectively top and side views of a storage hopper, gravity feed assembly for guiding waste materials into the shredder feed wheels.

Now with general reference to the perspective view of FIG. 1 and corresponding plan view of the shaft wheel assembly in FIG. 2, a single shredder stage is shown with some details removed such as shredder plates, feeding teeth, housing, etc. so that the general operation and assembly of the shredder may be more readily visualized.

For shredding automobile size rubber tires for example, the sets of anvil wheels 10 have a thirty inch (0.762 m) diameter wheels spaced apart axially on 3½ inch (8.89 cm) center lines along 4 inch (10.16 cm) diameter pulley shafts 11, 12 counter-rotated as shown by arrows 13, 14 by means of 15 HP drive motor 16 as reduced by belt-pulley changes and/or a variable speed drive gear reduction box 17 (shown driving shaft 12 as exemplary) to revolve at speeds in the range of 15 to 50 RPM to thereby feed downwardly onto conveyor belt 18, preferably driven by a variable speed motor 19. To feed materials into the shredder stage, a feed-in conveyor belt 20 is driven by a variable speed motor 21. Speed controls are not shown, but the variable speed feature gives optional choice for the rate of conveying input and output materials into and out of the shredder mechanism in the manner to be hereinafter set forth.

Figure 7:
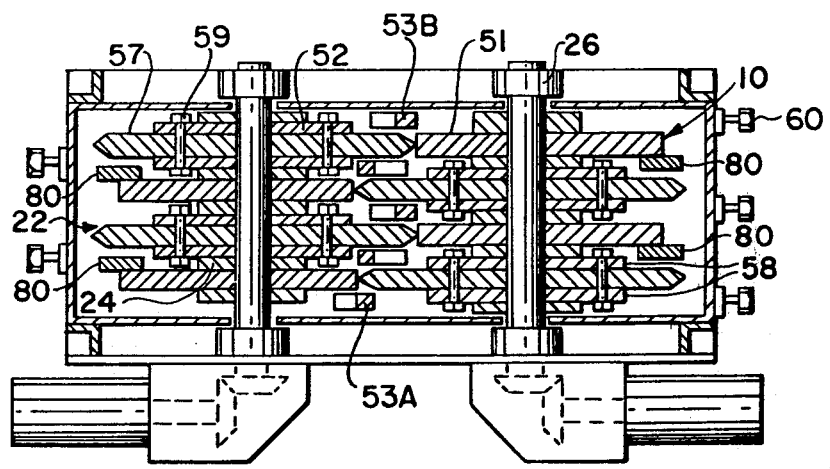

As may be seen best from FIG. 2, the wheels 10, 22 are respectively anvil and cutter blades in contact with each other and they are alternatively positioned along each of the shafts 11, 12 to thereby provide a feed direction downwardly as shown in FIG. 1, by means of both the circumference and sides of the wheels. That is the materials feed downwardly through the gaps between the wheels and are cut into strips or shreds to arrive on conveyor belt 18 for transport to a remote position such as a storage bin, truck or further conveyor system. The anvil wheels 10 are made of SSS100 steel alloy, and the cutter blades are made of Rockwell 49 tool steel, preferably in three 120° sectors mounted between two opposed faceplates of said steel alloy (as generally shown in FIG. 7), so that any damaged blades may be readily replaced without disassembly of the entire shaft. For this purpose blade parts and spacers 24 are held on the shafts by friction from nuts 23, and may be keyed to prevent slipping if desired. Suitable shaft bearings 26 are used as shown.

Figure 3:
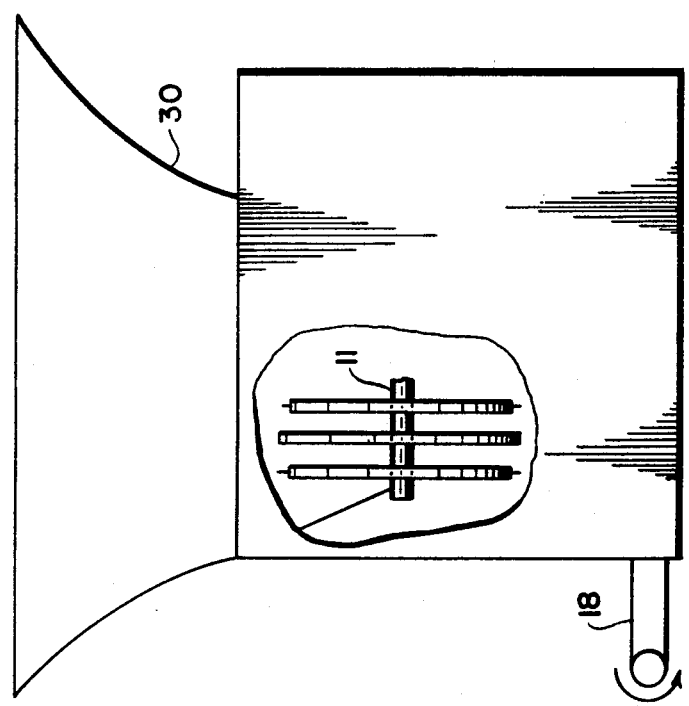

As may be seen from FIGS. 3 and 4 a feed hopper assembly 30 acts as a storage bin for receiving and mixing input materials to be shredded and feeding them into the counterrotating feed wheel assembly 31. These wheels process various types of materials to shred them and feed them downwardly so that they may be fed in shredded form out on conveyor belt. By friction action of the wheels both at the contact surfaces and on side of the wheel surfaces, materials fed thereinto will be dragged through the feed wheel knives and shredding members (not shown in this view) and emerge in reduced size dimensions.

So that all forms of waste including truck tires may be fed and intermixed into the feed and shredding wheel assembly 31 the upper dimensions of the feed hopper are 7 ft. 7½ inches (232.41 cm) by 8 ft. 1½ inches (247.65 cm) and the depth of the tapered side panels is 2 ft. 6 inches (76.2 cm), to feed a set of 30 inch (76.2 cm) diameter wheels spaced 3½ inches (8.89 cm) apart on 4 inch (10.16 cm) counterrotating shafts 11, 12.

Through this assembly when constructed in accordance with the teachings of this invention, a wide variety of materials can be shredded including 2 × 4 lumber beams, wet, oily steel belted truck tires and miscellaneous kinds of items generally found in trash and waste. As will hereinafter be noted, depending upon the mix and character of materials precessed, different feed speeds may be employed, and certain features are provided for better handling materials of different texture over a wide range such as cardboard, tree limbs, tires, carcasses, etc.

Figure 5:
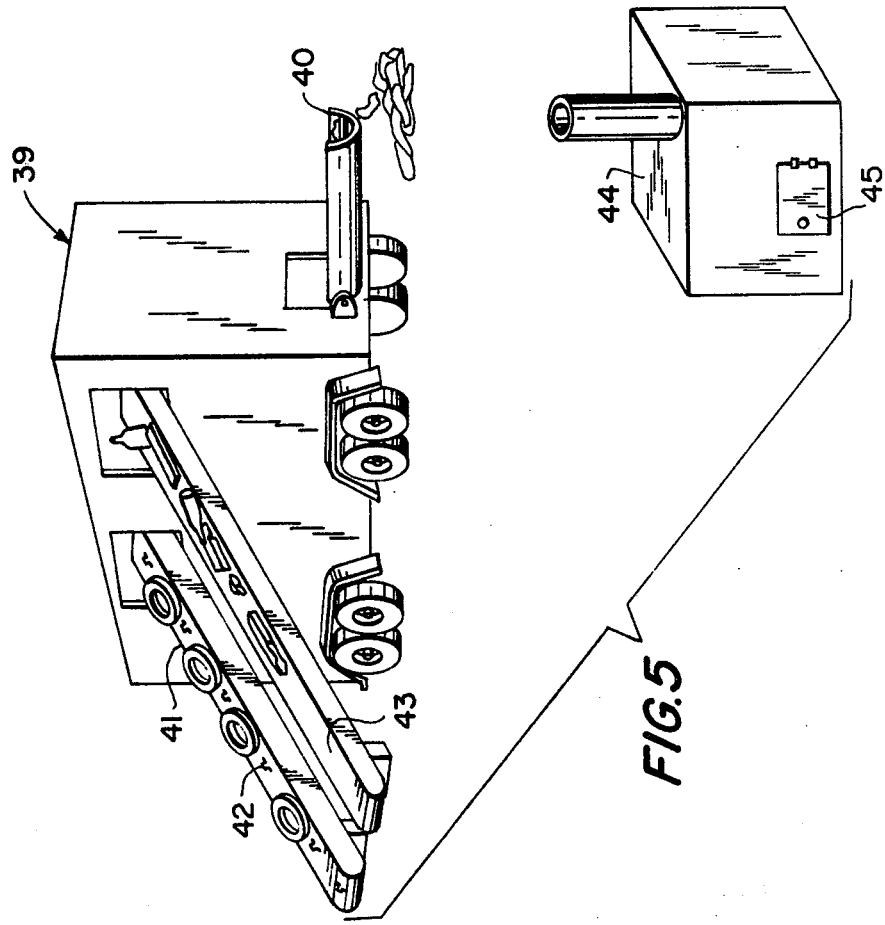
FIG. 5 is a diagrammatic view of a portable shredder assembly for processing and discharging two diverse kinds of waste materials including rubber tires.

As seen from FIG. 5, the shredder techniques afforded by this invention are adaptable to a portable unit 39 that can be moved from place to place by a conventional trailer hitch for example and perform on-site shredding of a variety of materials. The output shredded materials by way of output conveyor 40, (functioning as 18 in FIG. 1), which may be of the screw conveyor type either pipe style or half cylindrical as shown, is able to load shredded materials on trucks or other conveying equipment. Of course, an adequate electrical power source should be available for electric motor drive or equivalent gasoline engine belt drive equipment be supplied, in such portable unit.

This embodiment of FIG. 5 also exemplifies the handling efficiencies that can come from separation of input materials of diverse characteristics. Thus, rubber tires are conveyed on conveyor belt 41 which preferably has cogs 42 for gripping tire carcasses for positive conveyance up steep belt slopes. The drive mechanism for belts 41 and 43 are separate and of variable speed. Thus, when trash or garbage for example is processed on belt 43, it can be fed at a different rate, generally of greater volume throughput than the tires. If the material is garbage for example to be used as a fuel or otherwise incinerated, the tires can be mixed in proper proportions to give the desired fuel mixture. Both belts feed materials into a single storage hopper as shown in FIGS. 3, 4 for processing through the shredder wheel assembly such as shown in FIG. 1, all mounted inside the housing of portable unit 39. Thus, shredding can occur if desired at a collection site and transported as compacted waste. It is clear that the feeding of the tires and trash through the shredder facility will produce an output product material much more readily compacted in a smaller space either for conveyance, storage or dumping ground, than would be possible with the usual compression mechanisms used in waste disposal systems.

This portable unit 39 is particularly adapted to operate at an incinerator site where output conveyor 40 feeds the materials into the incinerator 44. This leaves only ashes removable by access door 45 that in general reduces and compacts the trash to its smallest volume form. When the rubber tires are properly mixed into the trash and shredded they can serve as the sole source of fuel for incineration, thus providing an efficient and economical trash disposal process. Under conditions where combustible materials such as waste paper, garbage, etc. are processed, there can be such efficient combustion even with damp garbage or other wet waste, that excess heat produced in the incineration can be used for other purposes such as steam generation or processing of industrial processes.

Figure 6:
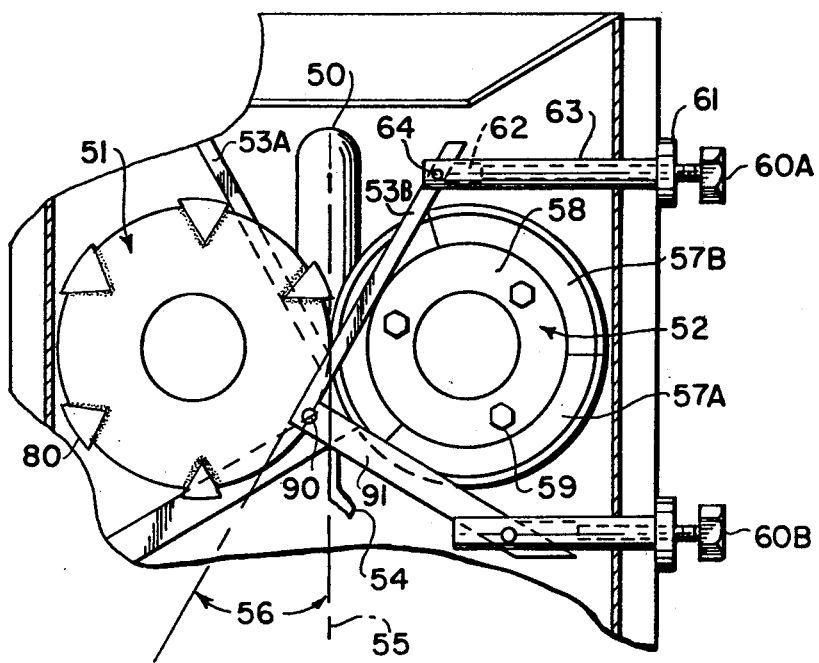
FIGS. 6 and 7 show the critical orientation of shredder blades with feed wheels to handle wide ranges of texture in the waste materials.

The operation of the shredder may be understood by reference to the views of FIGS. 6 and 7. This view depicts a tire 50 being fed downwardly through the feed path between counterrotating feed wheel sets 51, 52 comprising anvil wheels 10 and cutter wheels 22 and interposed shredding members 53 so that shreds 54 are discharged from the feed path. Thus, a vertical feed path along center line 55 results wherein the shredding member 53 is disposed at an angle 56.

Formerly as shown in C. A. Krigbaum U.S. Pat. No. 3,817,463 issued June 18, 1974, for example, the angle of the shredding member 53 with the feed path was fixed in the order of 65°. In accordance with this invention, however, the angle of the shredder member with the feed path as well as the distance of the shredder member from the axis of the feed wheels is variably adjustable. This has been found to be critical in the shredding of input materials of different size and texture.

The shredder member 53 is typically a ¼ inch (0.63 cm) thick steel plate that need not be sharpened as is the knife blade 57 on the wheel 52 similar in function to wheels 10, 22 hereinbefore described. The circular knife comprises three segments 57A, 57B etc. bolted by bolts 59 between plates 58, for ready access for removal if damaged.

The angle 56 of the shredder to the feed path is variably adjustable by a mechanism such as that shown, wherein bolts 60 threaded through nuts 61 slide member 62 within a slotted tubing 63 letting a movable pin change the lateral position of pivot point 64 and therefore change the angle 56 by moving member 53 about the pivot point 90 between upper member 53 and lower member 91. The pivot pins 64 are provided with necessary slots to permit a relative degree of movement so that the angle 56 can be varied between 30° and 50°.

The angle 56 is adjusted smaller for a greater volume of flow of materials downwardly through the feed path 55, and for longer objects. Thus, if the tire 50 were a bicycle size tire the angle would preferably be 50°, if an automobile tire would be 40° and if a truck tire would be 30°. The shredding action is greater as the angle 56 is larger. Therefore, the angle is changed for handling materials of different texture either for processing particular materials such as tree branches, tires or cardboard cartons or for processing a general averaged mixture of tires and waste as mixed by the FIG. 5 embodiment. Thus, materials of a wide range of texture as well as size may be processed to produce a shredded output product at optimum throughout speeds. Typical rotational speeds of the feed wheels 51, 52 are 14 RPM for auto tires and 50 RPM for prime garbage, with the shredder member 53 angle 56 at respectively near 50° and 30° respectively. Typically 1800 automobile tires per hour can be shredded at 22 RPM and a shredder member angle 56 of 40°.

In order to change the angle between wide limits both adjustment screws 60A and 60B are used, and the shown mechanism provides the additional feature of moving the shredder blade 53 laterally with respect to the axis of feed wheels 51, 52. This feature as well as others seen from the embodiment of FIG. 7 may be employed for processing special materials and introducing different tear or shredding forces. For example, the diameters of the cutter blade wheels 52 can be different than that of the anvil wheels 51, and the positions of the shredder members 53A, 53B can be differently disposed. Also, the spacings between wheels and wheel size may be varied. Thus, the various features of the embodiments of FIGS. 6 and 7 as shown may be taken singly or in combination to produce means for shredding different types of materials over a wide range of sizes and textures.

Figure 8:
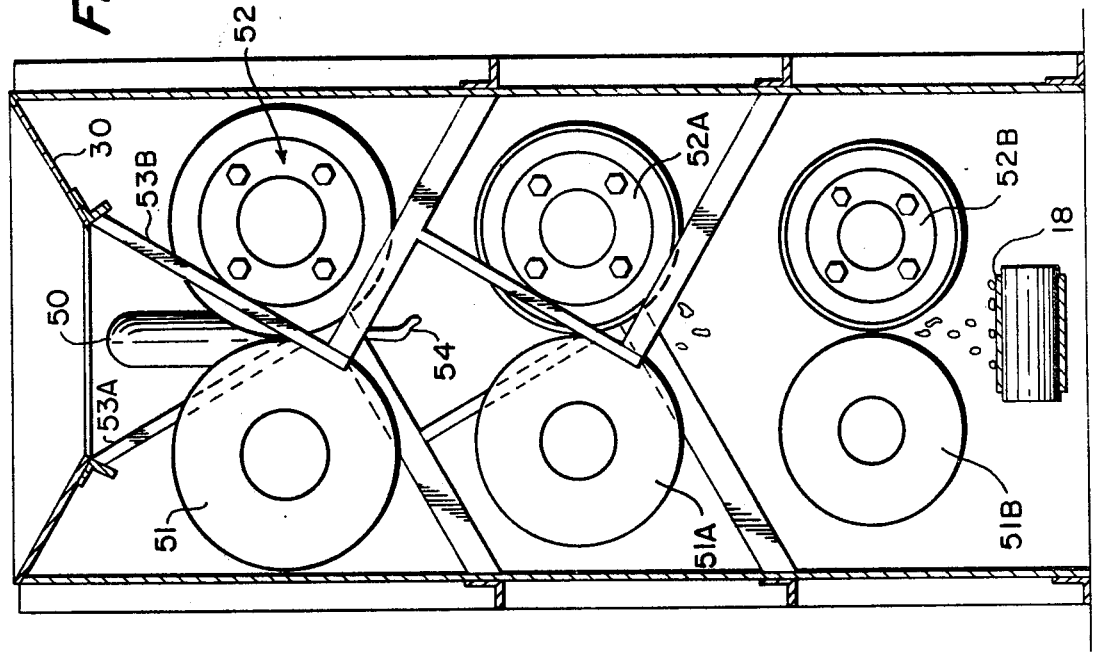
FIG. 8 shows a multiple stage shredder assembly.

When processing large throughput volumes, or when necessitating finer shreds in the output product, several shredder stages may be coupled in series along the feed path of the embodiment shown in FIG. 8. Thus, preferably each succeeding stage has smaller diameter wheels more closely spaced together, and the last stage has only the wheels without the shredder members 53.

For a shredder system handling a wide range of waste intermixed with rubber tires of various size including truck tires, the three stages would typically have the respective following dimensions:

51, 52 wheel diameter 40 inches (101.6 cm) spaced 6 inches (15.24 cm) apart on 6 inch (15.24 cm) diameter shafts;

51A, 52A wheel diameter 30 inches (76.2 cm) spaced 3½ inches (8.89 cm) apart on 4 inch (10.16 cm) diameter shafts; and 51B, 52B wheel diameter 20 inches (50.8 cm) spaced 2½ inches (6.35 cm) apart on 4 inch (10.16 cm) diameter shafts.

Special problems are created in handling damp waste and rubber tires. If tire carcasses are wet and oily, they are both difficult to feed and to shred. Also, steel belts on tires need be shredded and discharged. Garbage and wet fibers such as rags tends to accumulate and clog spaces between wheels and in general the feed chutes of the shredder mechanism. It is therefore particularly advantageous to process rubber tires intermixed with garbage and damp waste for several reasons. Tire carcasses cannot be handled properly in waste disposal or compacted and present a major waste disposal problem. This process and system uses such carcasses to particular advantage. Intermixing of tires in the shredder provides the various advantages of (1) self-cleaning and polishing of the system, (2) producing an output shredded product that is easily conveyed in compacted form, and (3) produces a combustible self-fueled output product that is readily incinerated for further compacting or for producing heat energy.

Therefore, to handle a wide range of materials including wet and oily steel belted truck tires, intermixed with garbage and bottles and baling wire and lumber or branches of trees and cans and metal cabinets and other items generally encountered in waste disposal, the feed wheels are preferably constructed as shown in FIG. 9.

As may be visualized by looking downwardly into the feed path of the plan view of FIG. 7, the positive feedthrough of materials is in part aided by the clamping between wheel knives and anvils, and partly impeded by encountering the shredding members. The triangular teeth 80 of FIG. 9 are for purposes of simplifying the drawing not shown in all the views of FIGS. 6 to 8 but are shown representatively only in FIGS. 6 and 7. The wheels also function as frictional pullers on their sides giving additional impetus and force to the feeding of materials through the feed path. However, for exceptional items including oily steel belted truck tires this may not produce sufficient conveyance traction, or produce shredding of the steel belts. Also, occasionally the feed wheels may become blocked by entry of a piece of heavy steel for example. Thus, it is desirable to provide de-clogging means.

These problems are resolved by the features shown in the FIG. 9 embodiment. Thus, triangular teeth 80 are welded 81 onto at least one side of at least the anvil wheels 51 to pass between members 53 and the wheels. These teeth are made of ¼ inch (0.635 cm) automobile spring steel and on a 30 inch (76.2 cm) diameter wheel, extend 1 inch (2.54 cm) into the radial direction and 1 inch (2.54 cm) outside the wheel circumference with a 7 inch (17.78 cm) spacing between teeth apices along the circumference of the wheel 51.

Such construction gives better feeding, shredding and throughput capabilities over a wider range of material textures, but additionally give enough traction to de-clog a stalled mechanism simply by reversing the drive motors.

Therefore, having set forth the particular construction and operational features of improved waste disposal systems, processes and apparatus, those novel features believed representative of the spirit and nature of the invention are set forth with particularity in the appended claims.

What is claimed is:

1. Apparatus for shredding a variety of waste materials comprising in combination, a set of interengaging counter-rotating wheels spaced apart on two parallel shafts wherein selected wheels have spaced teeth extending beyond the wheel circumference wherein the teeth comprise triangular shaped pieces affixed to the sides of said selected wheels by one apex and having two apices extending beyond the circumference of the wheels.

2. Apparatus as defined in claim 1 comprising a funnel shaped storage bin hopper storing materials and feeding them by gravity into contact with the interengaged wheels.

3. Apparatus as defined in claim 1 comprising a set of two input conveyors adapted to feed diverse materials into said apparatus, and means changing the relative speeds of said two conveyors.

4. An apparatus for shredding a variety of waste materials comprising in combination, a set of interengaging counter-rotating wheels spaced apart on two parallel shafts wherein selected ones of the rotating wheels have spaced teeth extending beyond the wheel circumference, a set of two elongated rectangular plate shredder members angularly disposed in the space between the wheels and pivotable about a common pivot point, and a mechanism coupled to at least one of the members remote from the pivot point permitting selectable change of relative position of said two members.

5. Apparatus as defined in claim 4 wherein said mechanism includes means adjusting each of said members remote from the pivot point in a direction perpendicular to the two shafts thereby changing the lateral position of said members relative to the axis of said shafts.

* * * * *